(12) United States Patent
Steininger

(10) Patent No.: US 12,114,614 B2
(45) Date of Patent: Oct. 15, 2024

(54) GRIPPER

(71) Applicant: Werner Steininger, Peuerbach (AT)

(72) Inventor: Werner Steininger, Peuerbach (AT)

(*) Notice: Subject to any disclaimer, the term of this patent is extended or adjusted under 35 U.S.C. 154(b) by 317 days.

(21) Appl. No.: 17/641,945

(22) PCT Filed: Sep. 9, 2020

(86) PCT No.: PCT/EP2020/075243
§ 371 (c)(1),
(2) Date: Mar. 10, 2022

(87) PCT Pub. No.: WO2021/048233
PCT Pub. Date: Mar. 18, 2021

(65) Prior Publication Data
US 2022/0304259 A1  Sep. 29, 2022

(30) Foreign Application Priority Data

Sep. 11, 2019 (AT) .............................. A 50790/2019

(51) Int. Cl.
*A01G 23/087* (2006.01)
*A01G 23/081* (2006.01)
*B25J 15/00* (2006.01)

(52) U.S. Cl.
CPC ......... *A01G 23/087* (2013.01); *A01G 23/081* (2013.01); *B25J 15/0028* (2013.01)

(58) Field of Classification Search
CPC .... A01G 23/08; A01G 23/081; A01G 23/083; A01G 23/087; A01G 23/091; A01G 23/093; A01G 23/095
See application file for complete search history.

(56) References Cited

U.S. PATENT DOCUMENTS 3,530,911 A * 9/1970 Hoadley .............. A01G 23/087
144/34.1
3,572,411 A   3/1971 Coughran
(Continued)

FOREIGN PATENT DOCUMENTS

CA    2411393    5/2004
DE    3151871    9/1982
(Continued)

OTHER PUBLICATIONS

Int'l Search Report (PCT/ISA/210) conducted in Int'l Appln. No. PCT/EP2020/075243 (Feb. 23, 2021).
(Continued)

*Primary Examiner* — Matthew Katcoff
(74) *Attorney, Agent, or Firm* — GREENBLUM & BERNSTEIN, P.L.C.

(57) ABSTRACT

A gripper having at least two gripper arms movably arranged in a pincer-like manner on a base part and a cutting device for material to be cut for attachment to a processing machine, wherein the cutting device is formed by a cutting plate, which is movable by a piston-cylinder unit from an active position, in which the cutting plate projects into a receiving space for the material to be cut enclosed by the gripper arms, into an inactive position, in which the cutting plate is retracted in the base part. The retractable and extendable piston rod of the piston-cylinder unit is connected to the cutting plate via a driver pin which, in the active position of the cutting plate, rests against an abutment of the base part when the cutting plate is loaded.

9 Claims, 6 Drawing Sheets

(56) References Cited

U.S. PATENT DOCUMENTS

Figure 1:
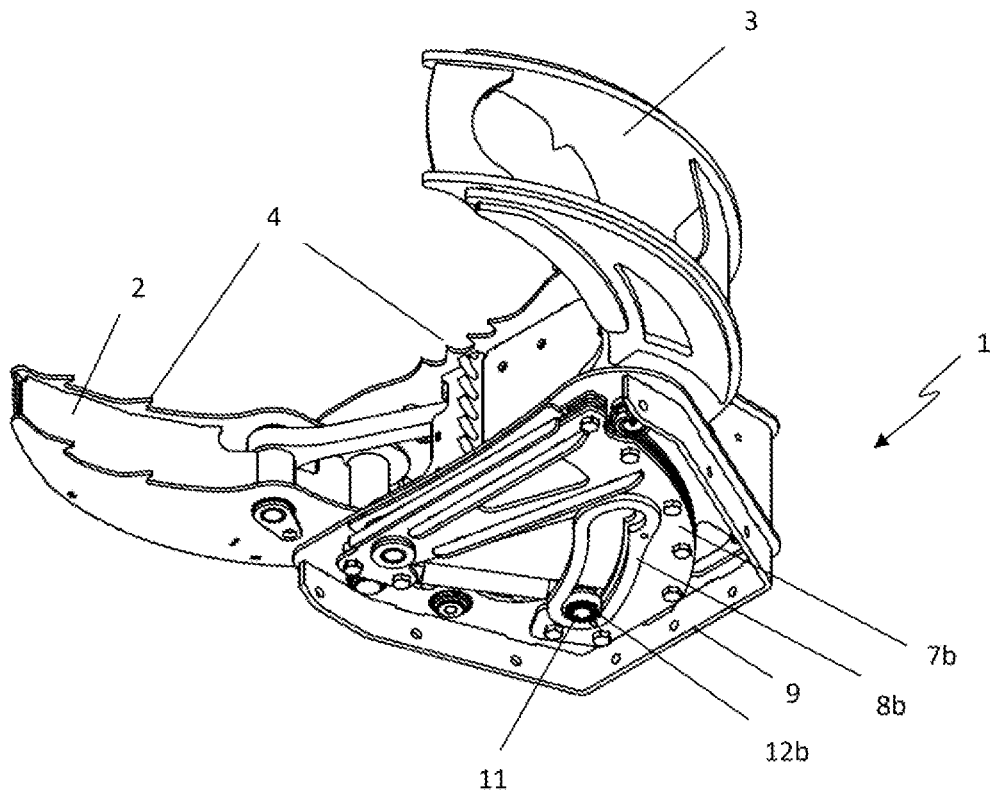

| | | | |
|---|---|---|---|
| 3,785,415 A | 1/1974 | Taponen | |
| 4,452,286 A | 6/1984 | Menzi | |
| 6,343,633 B1 * | 2/2002 | Larsson | G01C 9/10 |
| | | | 144/34.5 |
| 10,327,395 B2 * | 6/2019 | Gierkink | A01G 23/081 |
| 10,624,279 B1 * | 4/2020 | Mead | A01G 23/093 |
| 10,791,682 B2 * | 10/2020 | Kitchen | A01G 23/081 |
| 2008/0017273 A1 * | 1/2008 | Ronkko | A01G 23/081 |
| | | | 144/4.1 |
| 2012/0163950 A1 | 6/2012 | Seljestad | |
| 2018/0220599 A1 | 8/2018 | Kitchen | |

FOREIGN PATENT DOCUMENTS

| | | |
|---|---|---|
| DE | 10 2015 206 027 | 10/2015 |
| DE | 20 2018 100 191 | 12/2018 |
| WO | 98/54950 | 12/1998 |
| WO | 2005/099438 | 10/2005 |

OTHER PUBLICATIONS

Int'l Written Opinion (PCT/ISA/237) conducted in Int'l Appln. No. PCT/EP2020/075243 (Feb. 23, 2021).
Austria Search Report/Office Action conducted in counterpart Austria Appln. No. A 50790/2019 (Jul. 28, 2020).

* cited by examiner

GRIPPER

The present invention relates to a gripper having at least two gripper arms arranged in a pincer-like manner on a base part so as to be movable relative to one another and a cutting device for material to be cut for attachment to a processing machine, wherein the cutting device is formed by a cutting plate which is movable with the aid of a piston-cylinder unit from an active position, in which the cutting plate projects into a receiving space for the material to be cut enclosed by the gripper arms, into an inactive position, in which the cutting plate is retracted into the base part, wherein the cutting plate is pivotably mounted on the base part about a first pivot axis perpendicular to the cutting plate and the cylinder of the piston-cylinder unit is pivotably mounted on the base part about a second pivot axis parallel to the first pivot axis, according to the preamble of claim 1.

The gripper according to the invention having a cutting device for material to be cut is intended in particular for attachment to excavators, tractors or other processing machines. Devices of the mentioned type are mainly used for timber harvesting, wherein the gripper is part of a boom arm of a processing machine or is attached to it, preferably via a quick coupler. The operator can control the boom arm from a control panel of the processing machine in such a way that the gripper arms arranged on the base part of the gripper embrace the material to be cut, wherein subsequently a closing pressure is exerted on the gripper arms via a corresponding hydraulic system, which grip and fix the material to be cut via a pincer-like movement. The material to be cut includes bushes, thin tree trunks, but also thick, fully grown tree trunks. In this case, the gripper is used for handling the material to be cut, for example for sorting or for loading the material that has already been cut. Since it is sometimes also necessary to cut the material during handling, there are also embodiments in which the gripper is provided with a cutting device in the form of a cutting plate that can be moved with the aid of a piston-cylinder unit from an active position, in which the cutting plate projects into a receiving space for the material to be cut enclosed by the gripper arms, into an inactive position, in which the cutting plate is retracted in the base part and therefore also has no cutting effect. The operator can therefore selectively move the cutting device to its active position, in which the cutting plate projects into the receiving space of the gripper arms, by actuating the piston-cylinder unit. When the gripper arms are closed and the receiving space is thus narrowed, the material to be cut held in the receiving space is pressed against a cutting edge of the cutting plate and cut through. After cutting, the cut material can be further sorted or loaded onto a truck or similar. In order to use the gripper again primarily for sorting or loading already cut material, the cutting plate can be moved back into its inactive position by actuating the piston-cylinder unit, in which the cutting plate is retracted in the base part and thus no longer protrudes into the receiving space of the gripper arms.

In the course of a cutting operation carried out by actuating the gripper arms, the cutting plate is subjected to high loads which must be absorbed and dissipated by the cutting plate and its bearings. The desired mobility of the cutting plate between an active and an inactive position complicates the design of the gripper for such a high mechanical load capacity. In conventional embodiments, the forces acting on the cutting plate are dissipated either via the piston rod of the piston-cylinder unit, and/or via sliding or rolling bearings of the cutting plate. The piston-cylinder unit must therefore be dimensioned accordingly, but this increases the weight and size of the gripper accordingly. This contradicts the basic requirement to make the gripper as small and light as possible in order to increase its mobility and reduce the energy consumption for its use. Retrofitting the gripper with a cutting device also becomes increasingly unattractive as the size and weight of the cutting device increases. If the forces acting on the cutting plate are dissipated via the sliding or rolling bearings of the cutting plate, these bearings are subject to great wear, so that the service life of the cutting device is greatly reduced.

It is therefore the object of the invention to improve a gripper with a cutting device for material to be cut for attachment to a processing machine in such a way that the load capacity of the cutting device is increased and its wear is reduced accordingly, while the gripper can still be designed to be compact. Preferably, it should also be possible to retrofit the cutting device for a gripper.

These objects are achieved by the features of claim 1. Claim 1 relates to a gripper having at least two gripper arms arranged on a base part in a pincer-like manner so as to be movable relative to one another and a cutting device for the material to be cut for attachment to a processing machine, wherein the cutting device is formed by a cutting plate which, with the aid of a piston-cylinder unit, can be moved from an active position, in which the cutting plate projects into a receiving space for the material to be cut enclosed by the gripper arms, into an inactive position, in which the cutting plate is retracted in the base part, wherein the cutting plate is pivotably mounted on the base part about a first pivot axis perpendicular to the cutting plate, and the cylinder of the piston-cylinder unit is pivotably mounted on the base part about a second pivot axis parallel to the first pivot axis. In accordance with the invention, it is proposed that the retractable and extendable piston rod of the piston-cylinder unit is connected to the cutting plate via a driver pin which, in the active position of the cutting plate, rests against an abutment of the base part when the cutting plate is loaded, wherein the driver pin is guided via ball bearings in a link guide of the base part, the clear cross-section of which widens in the region of the abutment to ensure that the ball bearings are spaced apart from the leading cam track of the link guide when the driver pin rests against the abutment. The forces acting on the cutting plate are thus dissipated neither via the piston rod nor via the plain or roller bearings, but mainly via a driver pin which, in the active position of the cutting plate, rests directly against an abutment of the base part and therefore transmits the forces directly to the base part. Residual load forces are dissipated via the pivot bearing for the first pivot axis of the cutting plate, but these are small. The majority of the loads on the cutting plate act as a torque acting about the first pivot axis, which is dissipated by the driver pin and its direct contact on the abutment of the base part.

The driver pin thus essentially fulfills two tasks according to the invention. On the one hand, it transmits the movement of the piston rod of the piston-cylinder unit to the cutting plate, wherein the cutting plate is mounted on the base part so that it can pivot about a first pivot axis. The piston-cylinder unit is pivotably mounted on the base part about a second pivot axis parallel to the first pivot axis. The linear extension and return movement of the piston rod is thus converted via the driver pin into a pivoting movement of the cutting plate about the first pivot axis, with the piston-cylinder unit also moving about the second pivot axis. A very compact design can be achieved, for example, by arranging the first and second pivot axes close to each other and the piston-cylinder unit in the area of an edge of the cutting plate, so that the piston-cylinder unit moves in the plane of movement of the cutting plate in the course of its positioning movement.

In addition, the driver pin also fulfills the function of a bearing by resting against an abutment of the base part in the active position of the cutting plate. The piston-cylinder unit is thus only provided for the execution of the pivoting movement of the cutting plate and for the holding point of the cutting plate in its active and inactive position, but without having to absorb cutting forces, and can therefore be dimensioned accordingly small. The forces acting on the cutting plate during a cutting operation, on the other hand, are transferred directly to the base part via the driver pin, so that the sliding or roller bearings of the cutting plate can also be relieved.

According to the invention, it is provided that the driver pin is guided via ball bearings in a link guide of the base part, the clear cross-section of which widens in the area of the abutment to ensure that the ball bearings are spaced from the leading cam track of the link guide when the driver pin is in contact with the abutment. In the course of the pivoting movement of the cutting plate from its inactive position into its active position, the driver pin initially slides by means of the ball bearings along a leading cam track of the link guide and, in the active position of the cutting plate, reaches an end section of the link guide with an enlarged clear cross-section, where the driver pin rests against the abutment with its pin shell or by means of spacer rings arranged on the pin shell, and the leading cam track of the link guide moves slightly away from the ball bearings of the driver pin. This ensures that when the driver pin is loaded during a cutting operation, the ball bearings of the driver pin are completely relieved of load. During a return movement, the ball bearing comes back into contact with the opposite cam guide track of the link guide and ensures that the driver pin slides back into the inactive position of the cutting plate almost without friction and guided by the link guide.

Since the cutting plate is loaded during a cutting operation not only by forces acting in the cutting plate plane but also by normal and shear forces, it is advantageous to arrange the cutting plate between two guide plates that are attached to the base part. A particularly compact structural design provides for the cutting plate to be arranged between two guide plates of the base part, which define two mutually facing, parallel guide planes for the cutting plate, wherein the guide plates have an opening in their respective central region for the movement path of the piston-cylinder unit. The arrangement of the two guide plates and their spacing is selected in such a way that they permit guiding of the cutting plate in the course of its pivoting movement and support of the cutting plate in the course of the cutting process by allowing no or only very slight deflections of the cutting plate perpendicular to the cutting plate plane.

In such a structural design, the abutment can be realized simply by forming the link guide initially by means of two link frames, each of which is fastened or integrally formed on one of the two guide plates lying one above the other and each of which has an end section with an enlarged clear cross-section, wherein the abutment is formed by marginal edges of the guide plates which narrow the enlarged clear cross-section of the link frames in a viewing direction oriented perpendicular to the guide plates. In the active position of the cutting plate, the driver pin thus rests against marginal edges of the guide plates, and the ball bearings are exposed in the end section of the two outer link frames of the link guide, each with an expanded clear cross-section. During the extension and return movement of the piston rod, however, the driver pin can move undisturbed by the guide plates inside the link guide and slide along the leading cam tracks of the link guide.

A particularly space-saving embodiment can be realized in that the cutting edge of the cutting plate facing the receiving space and a rear marginal edge of the cutting plate extend at an acute angle to one another, the apex of which lies in the region of the first pivot axis, and merge into one another in their regions facing away from the first pivot axis via an arcuate marginal edge. Preferably, the piston-cylinder unit is arranged in such a way that the longitudinal axis of the piston-cylinder unit extends essentially parallel to the rear marginal edge of the cutting plate.

A preferred embodiment of the driver pin provides that the driver pin is attached to a free end of the piston rod of the piston-cylinder unit, wherein the driver pin is oriented with its longitudinal axis perpendicular to the cutting plate and engages a hook-shaped extension of the cutting plate.

The embodiment of the cutting device according to the invention can be compact and of flat construction, so that it can also be retrofitted to a gripper. It is therefore proposed that the cutting device is designed as a retrofit part of the gripper. For this purpose, the components of the cutting device comprising the cutting plate, the piston-cylinder unit with the driver pin, the guide plates and the link guide are accommodated by a common cover or housing, wherein the cover or housing is mountable as a separate component on the base part of the gripper. After connecting a hydraulic line for the piston-cylinder unit, the cutting device can be used.

Figure 2:
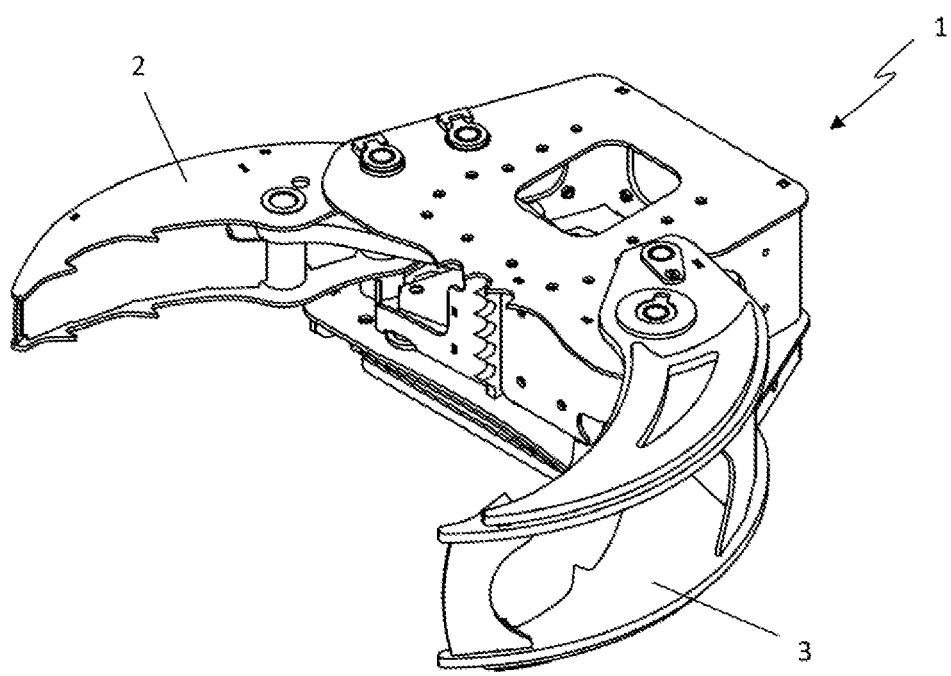
Figure 3:
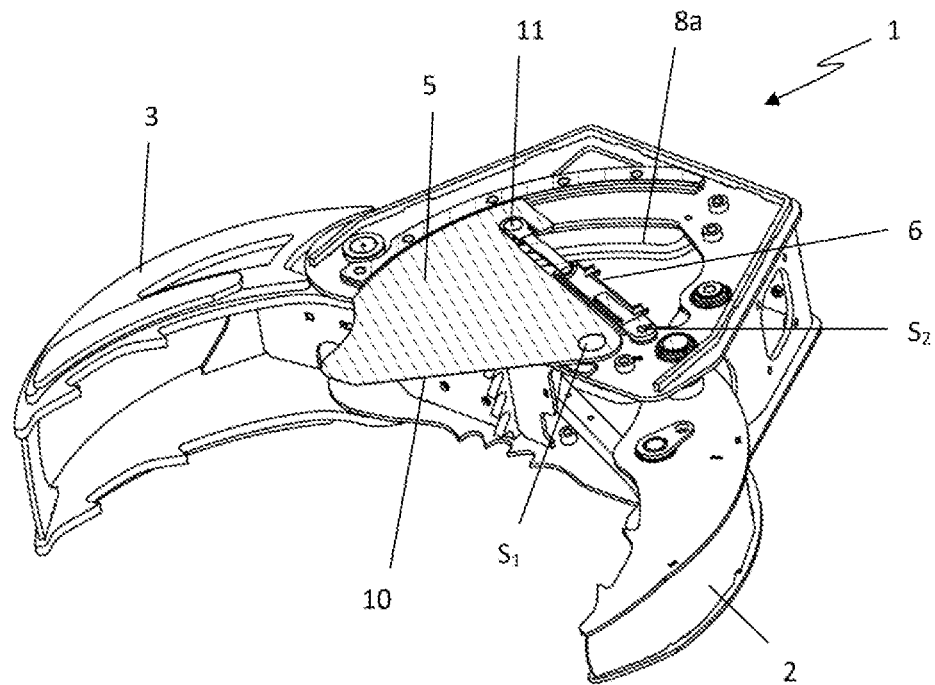
Figure 4A:
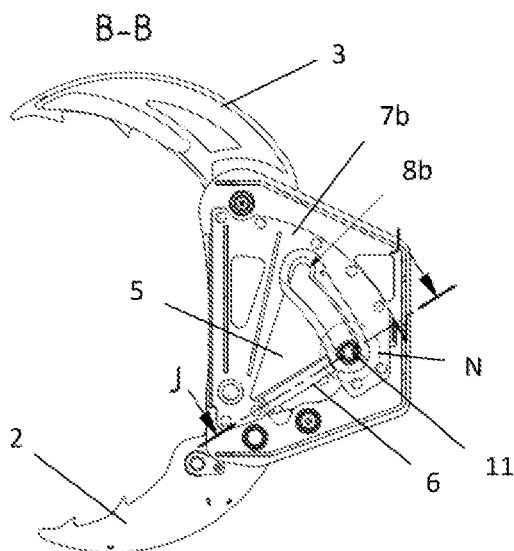
Figure 4B:
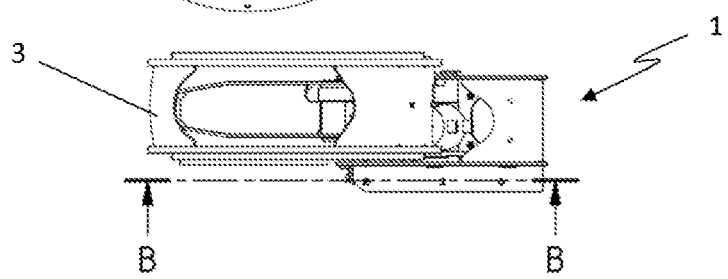
Figure 5:
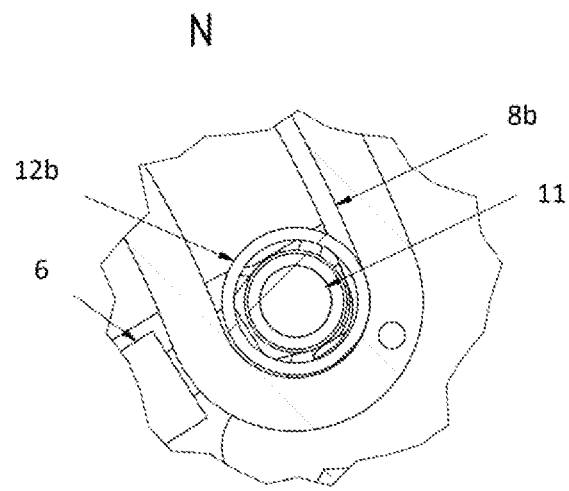
Figure 6:
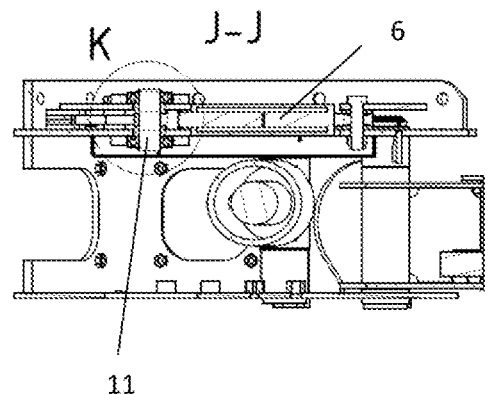
Figure 7:
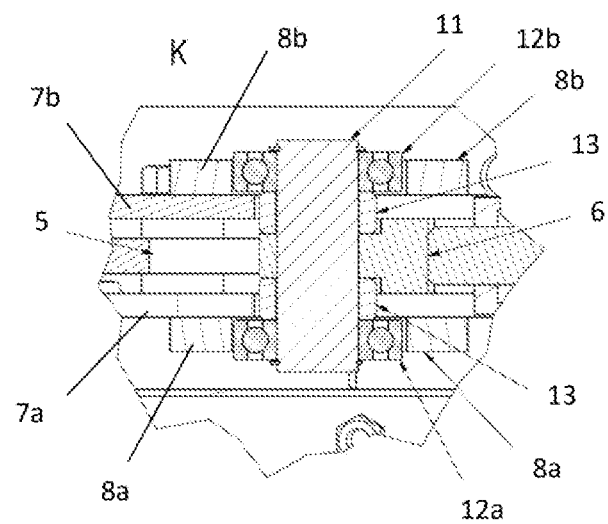
Figure 8A:
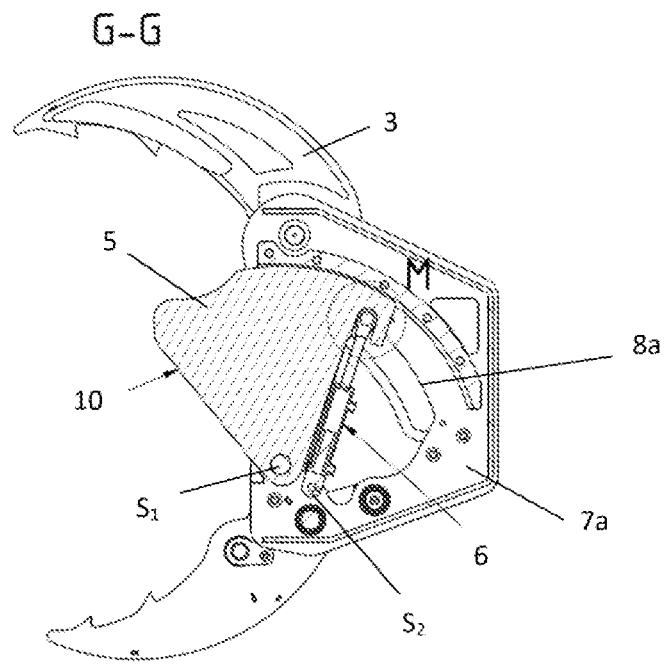
Figure 8B:
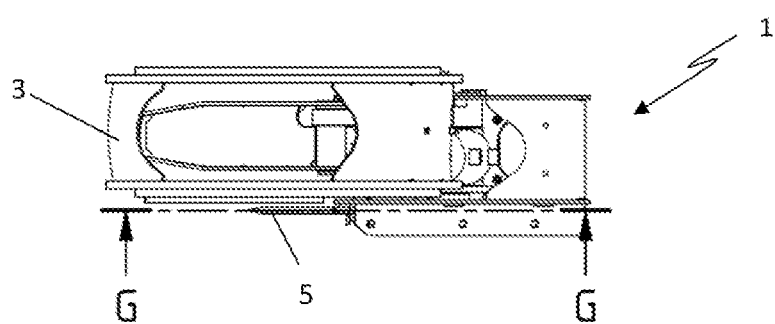
Figure 9:
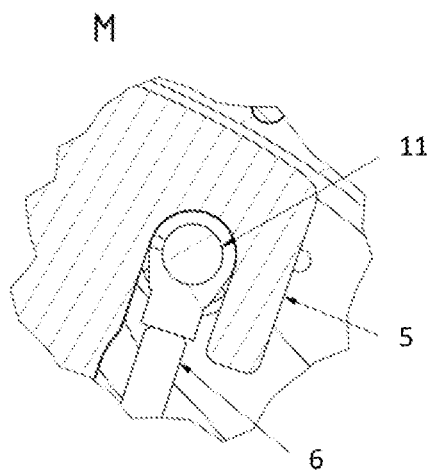
Figure 10A:
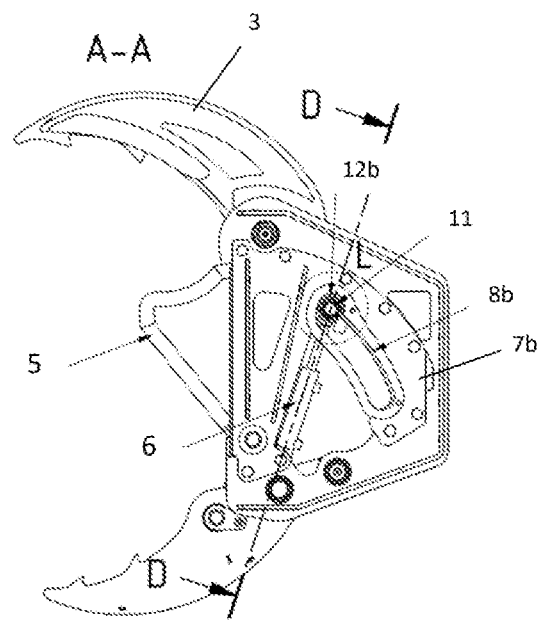
Figure 10B:
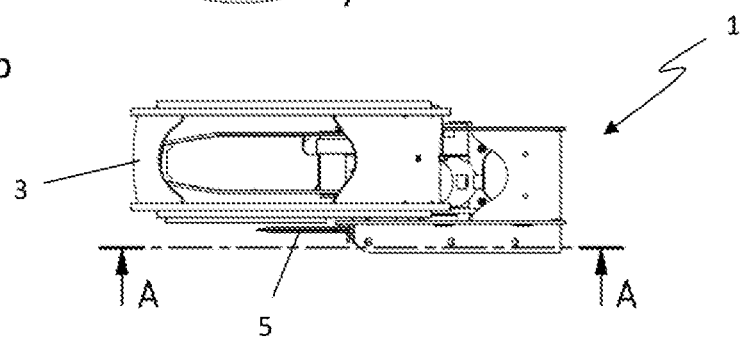
Figure 11:
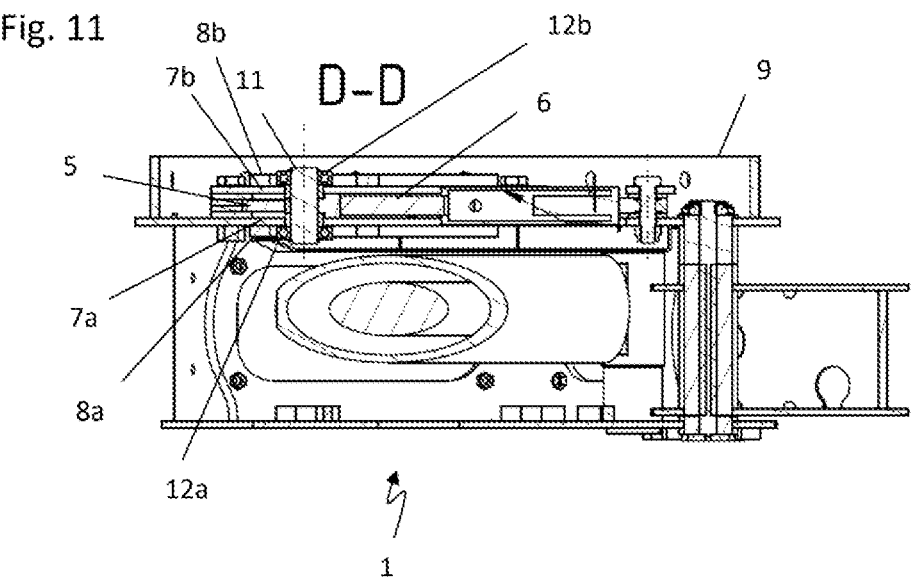
Figure 12:
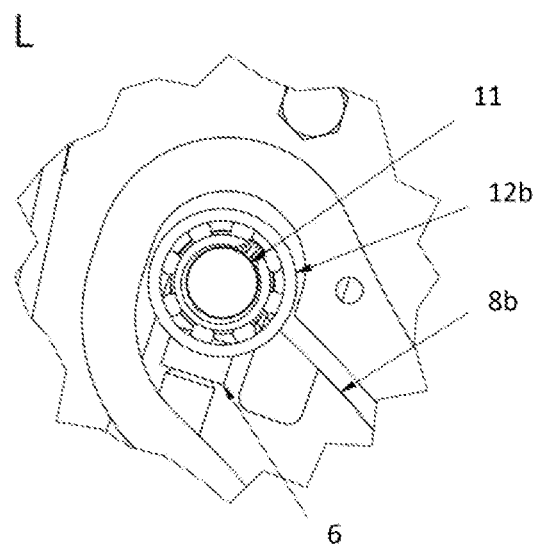

The invention is explained in more detail below by means of an exemplary embodiment with the aid of the accompanying figures. The figures show as follows:

FIG. 1 shows a perspective view for a section along the sectional plane B-B of FIG. 4b of a gripper according to the invention having a cutting device in the inactive position as seen from below, FIG. 2 shows a perspective view of a gripper according to the invention having a cutting device in the inactive position as seen from above, FIG. 3 shows a perspective view for a section along the sectional plane G-G of FIG. 8b of a gripper according to the invention having a cutting device in the active position as seen from below, FIG. 4a shows a sectional view according to the sectional plane B-B of FIG. 4b for a gripper according to the invention having a cutting device in the inactive position, FIG. 4b shows a side view of a gripper according to the invention having a cutting device in the inactive position, FIG. 5 shows a detailed view of "Detail N" of FIG. 4a, FIG. 6 shows a sectional view according to the sectional plane J-J of FIG. 4a for a gripper according to the invention having a cutting device in the inactive position, FIG. 7 shows a detailed view of "Detail K" of FIG. 6, FIG. 8a shows a sectional view according to the sectional plane G-G of FIG. 8b for a gripper according to the invention having a cutting device in the active position, FIG. 8b shows a side view of a gripper according to the invention having a cutting device in the active position, FIG. 9 shows a detailed view of "Detail M" of FIG. 8a, FIG. 10a shows a sectional view according to sectional plane A-A of FIG. 10b for a gripper according to the invention having a cutting device in the active position, FIG. 10b shows a side view of a gripper according to the invention having a cutting device in the active position, FIG. 11 shows a sectional view according to the sectional plane D-D of FIG. 10a for a gripper according to the invention having a cutting device in the active position, and FIG. 12 shows a detailed view of "Detail L" of FIG. 10a.

First, reference is made to FIGS. 1-3, which show a gripper according to the invention having a cutting device in the inactive position (FIGS. 1 and 2) and in the active position (FIG. 3). The cutting device is arranged at the lower end of a base part 1. At the front end of the base part 1, two gripper arms 2, 3 are provided, which are arranged on the base part 1 in a pincer-like manner so as to be movable relative to one another. The two gripper arms 2, 3 are preferably acted upon with closing pressure by hydraulic means known per se, in order to firmly embrace and hold the material to be cut in a receiving space located between them. When the gripper arms 2, 3 are closed around the material to be cut, the gripper arms 2, 3 move towards each other. When the gripper arms 2, 3 are opened hydraulically, the gripper arms 2, 3 move away from each other to release the material to be cut. The gripper arms 2, 3 and the base part 1 have a surface with tooth-shaped projections 4 in sections on their side facing the material to be cut. When the gripper arms 2, 3 are closed around the material to be cut with closing pressure, the tooth-shaped projections 4 engage in the material to be cut in order to strengthen the fixation of the material to be cut.

A connecting device, not shown in more detail, is provided at the rear of the base part 1. The connection device is used to attach the base part 1 to a processing machine, such as the boom arm of an excavator or another processing machine, which can accommodate the connection device and support the weight of the material to be cut via the base part 1. The connection device is also used to connect the hydraulic lines for controlling the gripper arms 2, 3 and the cutting device.

The cutting device can also be designed as a retrofit part and in this case is attached to the lower end of a base part 1, for example by means of screw connections. The cutting device comprises a cutting plate 5, as well as a piston-cylinder unit 6 which moves the cutting plate 5, two guide plates 7a, 7b for the cutting plate 5, as well as two outer link frames 8a, 8b of a link guide. The cutting device may further comprise a cover 9 attached to the base part 1, which accommodates the cutting device and is open on the outlet side of the cutting plate 5.

As can also be seen in particular in FIGS. 4, 8 and 10, the guide plates 7a, 7b of the base part 1 are arranged parallel to one another in the exemplary embodiment shown, and they have an opening in their respective central region for the movement path of the piston-cylinder unit 6. A link frame 8a, 8b is attached or formed on each of the outer sides of the two guide plates 7a, 7b facing away from each other, which together form a link guide. Between the two guide plates 7a, 7b, the cutting plate 5 is pivotably arranged on the base part 1 about a first pivot axis S1 perpendicular to the cutting plate 5. In the vicinity of the first pivot axis S1, a pivot bearing of the piston-cylinder unit 6 is arranged with a second pivot axis S2, which is parallel to the first pivot axis S1. The longitudinal axis of the piston-cylinder unit 6 extends essentially along a rear marginal edge of the cutting plate 5 facing away from the cutting edge 10. In the exemplary embodiment shown, the cutting plate 5 is designed in such a way that the cutting edge 10 and the rear marginal edge extend at an acute angle to one another, the apex of which lies in the region of the first pivot axis S1, and merge into one another in their regions facing away from the first pivot axis S1 via an arcuate marginal edge. The cutting plate 5 therefore has an approximately circular sector-shaped appearance.

The piston-cylinder unit 6 is hinged with its cylinder to the pivot bearing with the second pivot axis S2 on the base part 1. As mentioned, the cylinder extends essentially along a rear marginal edge of the cutting plate 5 facing away from the cutting edge 10 and has a piston rod which is provided with a driver pin 11 at its free end. The driver pin 11 is oriented with its longitudinal axis perpendicular to the cutting plate 5 and engages in a hook-shaped extension of the cutting plate 5 (see FIGS. 8a and 9), which is designed in such a way that, during an extension or return movement of the piston rod, the linear positioning movement of the piston rod is converted into a pivoting movement of the cutting plate 5 about the first pivot axis S1. In the process, the driver pin 11 is guided by the link guide, in which the driver pin 11 is mounted by means of two ball bearings 12a, 12b arranged at the end of the driver pin 11. The driver pin 11 is thus guided at its two ends via the ball bearings 12a, 12b in the two outer link frames 8a, 8b of the link guide and penetrates in its central region the clear opening of the hook-shaped extension of the cutting plate 5, where the piston rod of the piston-cylinder unit is also fastened, as can be seen for example in FIG. 6 and FIG. 7.

In the inactive position of the cutting plate 5, the driver pin 11 is located in an end section of the link guide facing the second pivot axis S2, as can be seen in FIGS. 4-7. The cutting plate 5 is in its retracted position and is held in this position with the aid of the piston-cylinder unit 6

By actuating the piston-cylinder unit 6 and an extension movement of its piston rod, the driver pin 11 is moved in the direction of the end section of the link guide facing away from the second pivot axis S2, wherein the driver pin 11 rolls along the corresponding cam guide tracks of the link guide via the two ball bearings 12a, 12b. This extension movement is converted into a pivoting movement of the cutting plate 5 about the first pivot axis S1 and is very smooth-running due to the ball bearings 12a, 12b used, so that the piston-cylinder unit 6 can be dimensioned to be correspondingly small.

At the end of the extension movement of the piston rod, the cutting plate 5 finally reaches its active position, in which the cutting edge 10 projects into the receiving space enclosed by the gripper arms 2, 3, as can be seen in FIG. 8a and FIG. 10a. At its end section facing away from the second pivot axis S2, the link guide has a widened clear cross-section compared to its end section facing the second pivot axis S2 (see in particular FIG. 12), which is crossed by the guide plates 7a, 7b in a viewing direction oriented perpendicular to the guide plates 7a, 7b. In a viewing direction oriented perpendicular to the guide plates 7a, 7b, these transverse marginal edges narrow the widened clear cross-section of the link frames 8a, 8b and form the abutment for the driver pin 11. As soon as the driver pin 11 reaches the end section of the link guide facing away from the second pivot axis S2, it comes into contact with its pin shell with these transverse marginal edges of the guide plates 7a, 7b, as can be seen in FIGS. 8-12, wherein spacer rings 13 can also be provided for this purpose, which can be seen in particular in FIG. 11. In this active position of the cutting plate 5, the marginal edges of the guide plates 7a, 7b, which cross the expanded clear cross-section of the link guide, form the abutment for the driver pin 11, via which forces acting in the cutting plate plane can be dissipated into the base part 1. The enlarged clear cross-section of the link guide in this end section ensures that the ball bearings 12a, 12b are exposed, i.e. do not rest against the leading cam track of the link guide. The ball bearings 12a, 12b are thus completely relieved of load when the cutting plate 5 is loaded and are therefore not subject to wear. Residual load forces are dissipated via the pivot bearing for the first pivot axis of the cutting plate 5, but these are small. The majority of the loads on the cutting plate 5 act as a torque acting about the first pivot axis, which is dissipated by the driver pin 11 and its direct contact with the abutment of the base part 1.

It is thus immediately apparent that with the gripper according to the invention, the load-bearing capacity of the cutting device is increased and its wear reduced accordingly, while the gripper can still be designed to be compact. This means that the cutting device can also be retrofitted for a gripper.

The invention claimed is:

1. A gripper comprising:
    at least two gripper arms arranged in a pincer-like manner on a base part so as to be movable relative to one another; and
    a cutting device for material to be cut for attachment to a processing machine is formed by a cutting plate which is movable with the aid of a piston-cylinder unit from an active position, in which the cutting plate projects into a receiving space for a material to be cut enclosed by the at least two gripper arms, into an inactive position, in which the cutting plate is retracted in the base part,
    wherein the cutting plate is pivotably mounted on the base part about a first pivot axis perpendicular to the cutting plate, and a cylinder of the piston-cylinder unit is pivotably mounted on the base part about a second pivot axis parallel to the first pivot axis,
    wherein a retractable and extendable piston rod of the piston-cylinder unit is connected to the cutting plate via a driver pin which, in the active position of the cutting plate, rests against an abutment of the base part when the cutting plate is loaded,
    wherein the driver pin is guided via ball bearings in a link guide of the base part, a clear cross-section of which widens in a region of the abutment to ensure a spacing of the ball bearings from a leading cam track of the link guide when the driver pin rests against the abutment.

2. The gripper according to claim 1, wherein the cutting plate is arranged between two guide plates of the base part, which define two mutually facing, parallel guide planes for the cutting plate, wherein the guide plates comprise an opening in respective central regions for the movement path of the piston-cylinder unit.

3. The gripper according to claim 2, wherein the link guide is formed by two link frames which are each fastened or formed on one of the two guide plates lying one above the other and each have an end section with an enlarged clear cross-section, wherein the abutment is formed by marginal edges of the guide plates which, in a viewing direction oriented perpendicularly to the guide plates, narrow the widened clear cross-section of the link frames.

4. The gripper according to claim 1, wherein the cutting edge of the cutting plate facing the receiving space and a rear marginal edge of the cutting plate extend at an acute angle to one another, an apex of which lies in a region of the first pivot axis, and merge into one another in regions facing away from the first pivot axis via an arcuate edge.

5. The gripper according to claim 4, wherein a longitudinal axis of the piston-cylinder unit is substantially parallel to the rear marginal edge of the cutting plate.

6. The gripper according to claim 1, wherein the driver pin is fixed to a free end of the piston rod of the piston-cylinder unit, wherein a longitudinal axis of the driver pin is oriented perpendicular to the cutting plate and engages a hook-shaped extension of the cutting plate.

7. The gripper according to claim 1, wherein the cutting device is designed as a retrofit part of the gripper.

8. A processing machine comprising a gripper according to claim 1.

9. The gripper according to claim 7, wherein the retrofit part is attached to a lower end of the base part.

\* \* \* \* \*